(12) United States Patent
Yuhara

(10) Patent No.: US 7,170,398 B2
(45) Date of Patent: Jan. 30, 2007

(54) WARNING APPARATUS, WARNING SERVER, WARNING SYSTEM, AND AUTOMOBILE

(75) Inventor: Masahiro Yuhara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/357,322

(22) Filed: Feb. 17, 2006

(65) Prior Publication Data

US 2006/0145821 A1   Jul. 6, 2006

Related U.S. Application Data

(62) Division of application No. 10/693,063, filed on Oct. 24, 2003, now Pat. No. 7,023,328.

(30) Foreign Application Priority Data

Oct. 28, 2002   (JP)   .............................. 2002-312805

(51) Int. Cl.
*B60Q 1/00*   (2006.01)

(52) U.S. Cl. ............... 340/425.5; 340/539.1; 340/539.22; 340/457; 340/901; 340/933

(58) Field of Classification Search .............. 340/425.5, 340/426, 539.1, 457, 901, 933, 539.22
See application file for complete search history.

(56) References Cited

U.S. PATENT DOCUMENTS

| 5,325,291 | A  | 6/1994 | Garrett et al. ................. 705/4 |
| 6,233,563 | B1 | 5/2001 | Jefferson et al. ............... 705/4 |
| 6,847,965 | B2 | 1/2005 | Walker et al. ................. 707/5 |
| 2002/0135466 | A1 | 9/2002 | Bunyan ..................... 340/426 |

FOREIGN PATENT DOCUMENTS

| DE | 100 57 423 A1 | 7/2001 |
| EP | 0 926 023 A2  | 6/1999 |
| ES | 2 125 813 A1  | 3/1999 |
| FR | 2 704 670 A1  | 11/1994 |

*Primary Examiner*—Tai Nguyen
(74) *Attorney, Agent, or Firm*—Pearne & Gordon LLP

(57) ABSTRACT

Herein disclosed is a warning apparatus for an automobile, comprising: a receiving unit for receiving a driver's information from a memory device memorizing said driver's information; a memorizing unit for memorizing an automobile insurance information; a determining unit for determining whether or not the driver is an insurant on the basis of said driver's information and the automobile insurance information; and a warning unit for warning the driver not to drive when the determining unit has determined that the driver is not said insurant.

8 Claims, 7 Drawing Sheets

FIG. 7

| DAY AND TIME OF JUDGING | RESULTS OF JUDGING | DAY AND TIME OF RECEPTION OF DRIVE STARTING SIGNAL | VALIDITY OF INSURANCE |
|---|---|---|---|
| 7/9/02 4:05 | CONFORMED | 7/9/02 4:10 | VALID |
| 8/11/02 4:05 | NOT CONFORMED | NONE | INVALID |
| 9/10/02 4:05 | NOT CONFORMED | 9/10/02 20:15 | INVALID |
| ... | ... | ... | ... |

WARNING APPARATUS, WARNING SERVER, WARNING SYSTEM, AND AUTOMOBILE

CROSS-REFERENCE TO RELATED APPLICATIONS

This application is a DIV of application 10/693,063 filed on Oct. 24, 2003, now U.S Pat. No. 7,023,328

BACKGROUND OF THE INVENTION

1. Field of the Invention

The present invention relates to a warning apparatus, a warning server, a warning system, and an automobile, and more particularly to a warning apparatus to be installed into an automobile, and decide whether or not to immobilize an automobile on the basis of driver's information and insurance information.

2. Description of the Related Art

Up until now, there have been provided a wide variety of warning apparatus available in the process of preventing an automobile from being started and driven by an unqualified driver.

The conventional warning apparatus of this type is disclosed in, for example, Japanese Patent Laying-Open Publication No. 08-96042. The conventional warning apparatus comprises a communications unit for communicating with an electronic driver's license having license information on driver's license and automobile insurance information on the expiration date of insurance and the telephone number of insurance company, and a determining unit for determining whether or not to update the insurance on the basis of the automobile insurance information on the expiration date of the insurance received from the electronic driver's license.

The conventional warning apparatus constructed as previously mentioned, however, encounters such a problem that the automobile tends to be started and operated by the unqualified driver who is not conformable to age restriction, family rider, and other requirement for being insurant.

SUMMARY OF THE INVENTION

It is, therefore, an object of the present invention to provide a warning apparatus, a warning server, and a warning system can prevent the automobile from being started and operated by the unqualified driver.

According to the first aspect of the present invention, there is provided a warning apparatus for an automobile, comprising: a receiving unit for receiving a driver's information from a memory device memorizing the drover's information; a memorizing unit for memorizing an automobile insurance information; a determining unit for determining whether or not the driver is an insurant on the basis of the driver's information and the automobile insurance information; and a warning unit for warning the driver not to drive when the determining unit has determined that the driver is not the insurant.

The warning apparatus may further comprise a permission signal producing unit for producing a permission signal to permit the driver to operate the automobile when the determining unit has determined that the driver is the insurant.

The warning apparatus may further comprise a prevention signal producing unit for producing a prevention signal to prevent the driver from operating the automobile when the determining unit has determined that the driver is not the insurant.

The receiving unit may be operative to receive the driver's information from the memory device by performing wireless communications with the memory device.

The memorizing unit may be constituted of a detachable memory device having memorized the automobile insurance information.

The warning apparatus may further comprise a communications unit for obtaining an automobile insurance information from the server memorizing the automobile insurance information. The memorizing unit may be operative to memorize the automobile insurance information obtained by the communications unit.

The determining unit may be operative to determine whether or not the driver is an insurant on the basis of the automobile insurance information memorized in the memorizing unit when the determining unit has determined that the driver is not the insurant.

According to the second aspect of the present invention, there is provided a warning system, comprising: a server having automobile insurance information; and a warning apparatus for an automobile, the warning apparatus, including: a receiving unit for receiving the driver's information; a communications unit for obtaining the automobile insurance information from the server by performing communications with the server; a memorizing unit for memorizing the automobile insurance information obtained by the communications unit; a determining unit for determining whether or not the driver is an insurant by comparing the driver's information received by the receiving unit with the automobile insurance information obtained by the communications unit; and a warning unit for warning the driver not to drive when the determining unit of the warning apparatus has determined that the driver is not the insurant.

The warning apparatus may further include a permission signal producing unit for producing a permission signal to permit the driver to operate the automobile when the determining unit of the warning apparatus has determined that the driver is the insurant.

The warning apparatus may further include a prevention signal producing unit for producing a prevention signal to prevent the driver from operating the automobile when the determining unit of the warning apparatus has determined that the driver is not the insurant.

The receiving unit of the warning apparatus may be operative to receive the driver's information by performing wireless communications.

The determining unit of the warning apparatus may be operative to determine whether or not the driver is an insurant on the basis of the driver's information received by the receiving unit of the warning apparatus and the automobile insurance information memorized in the memorizing unit of the warning apparatus when the automobile insurance information is not obtained from the server by the communications unit of the warning apparatus within a predetermined time period.

The warning system may further comprise a memory device having driver's information. The receiving unit of the warning apparatus may be operative to receive the driver's information from the memory device.

The memory device may be constituted of an electronic key to the automobile.

The memory device may be constituted of an electronic driver's license having license information on the automobile.

The warning apparatus may further include a determining unit for determining whether or not the license information is legitimate on the basis of the license information memorized in the electronic driver's license.

According to the third aspect of the present invention, there is provided a warning server, comprising: a communications unit for receiving driver's information; a memorizing unit for memorizing automobile insurance information; and a determining unit for determining whether or not the driver is an insurant by comparing the driver's information received by the communications unit with the automobile insurance information memorized in the memorizing unit, and the communications unit being operative to transmit results information on results determined by the determining unit.

The warning server may further comprise a results information memorizing unit for memorizing the results information on results determined by the determining unit.

The communications unit may be operative to receive condition information on a start of the automobile. The results information storing unit may be operative to produce supervisory information on mutual relation between the results information with the condition information received by the communications unit, and to memorize the supervisory information.

The warning server may further comprise an accounting model deciding unit for deciding on an accounting model on the basis of the supervisory information memorized in the results information storing unit.

According to the fourth aspect of the present invention, there is provided a warning system, comprising: a warning apparatus for an automobile; and a waning server to be communicated with the warning apparatus, the warning server, including: a communications unit for receiving driver's information from the warning apparatus; a memorizing unit for memorizing automobile insurance information; and a determining unit for determining whether or not the driver is an insurant by comparing the driver's information received by the communications unit with the automobile insurance information memorized in the memorizing unit, and the warning apparatus including a warning unit for warning the driver not to drive when the determining unit of the warning server has determined that the driver is not the insurant.

The warning apparatus may further include a permission signal producing unit for producing a permission signal to permit the driver to operate the automobile when the determining unit of the warning server has determined that the driver is the insurant.

The warning apparatus further includes a prevention signal producing unit for producing a prevention signal to prevent the driver from operating the automobile a prevention when the determining unit of the warning server has determined that the driver is not the insurant.

The warning server may further include a results information storing unit for memorizing results information on results determined by the determining unit of the warning server.

The communications unit of the warning server is operative to receive condition information on a start of the automobile from the warning apparatus. The results information storing unit of the warning server may be operative to produce supervisory information on mutual relation between the results information with the condition information received by the communications unit of the warning server, and to memorize the supervisory information.

The warning server may further include an accounting model deciding unit for deciding on an accounting model on the basis of the supervisory information memorized in the results information storing unit.

The warning system may further comprise a memory device for memorize driver's information. The receiving unit of the warning server may be operative to receive the driver's information from the memory device through the warning apparatus.

The memory device may be constituted of an electronic key to the automobile.

The memory device may be constituted of an electronic driver's license having license information on the automobile.

The warning server may further include a determining unit for determining whether or not the license information is legitimate on the basis of the license information memorized in the electronic driver's license.

According to the fifth aspect of the present invention, there is provided an automobile, comprising: an engine control unit for controlling an engine; and a warning apparatus for an automobile, the warning apparatus, including: a receiving unit for receiving driver's information from the memory device memorizing the driver's information; a memorizing unit for memorizing automobile insurance information; a determining unit for determining whether or not the driver is an insurant by comparing the driver's information received by the receiving unit with the automobile insurance information memorized in the memorizing unit; and a permission signal producing unit for producing a permission signal to permit the driver to operate the automobile when the determining unit has determined that the driver is the insurant, and the engine control unit is operative to have the engine start in response to the permission signal produced by the permission signal producing unit of the warning apparatus.

The warning apparatus may further include a warning unit for warning the driver on the basis of results determined by the determining unit when the determining unit has determined that the driver is the insurant.

The receiving unit of the warning apparatus may be operative to receive the driver's information from the memory device by performing wireless communications with the memory device.

The memorizing unit of the warning apparatus may be constituted of a detachable memory device previously have memorized therein the automobile insurance information.

The communications unit of the warning apparatus may be operative to obtain automobile insurance information from the server memorizing the automobile insurance information. The memorizing unit of the warning apparatus may be operative to memorize the automobile insurance information obtained by the communications unit of the warning apparatus.

The determining unit of the warning apparatus may be operative to determine whether or not the driver is an insurant on the basis of the automobile insurance information memorized in the memorizing unit of the warning apparatus when the automobile insurance information is not obtained from the server by the communications unit of the warning apparatus within a predetermined time period.

According to the sixth aspect of the present invention, there is provided a warning apparatus to be installed into an automobile, and operable in combination with a memory device having driver's information on personal details, comprising: a receiving unit for receiving the driver's information from the memory device; a memorizing unit having automobile insurance information on a requirement for being insurant; a first determining unit for determining whether or not the personal details are conformable to the requirement for being insurant by comparing the driver's information received by the receiving unit with the automobile insurance information memorized in the memorizing unit; and a warning unit for warning the driver on the basis of results determined by the first determining unit when the first determining unit is operated to determine that the personal details are not conformable to the requirement for being insurant.

The warning apparatus may further comprise a permission signal producing unit for producing a permission signal to permit the driver to operate the automobile when the first determining unit is operated to determine that the personal details are conformable to the requirement for being insurant.

The warning apparatus may further comprise a prevention signal producing unit for producing a prevention signal to prevent the driver from operating the automobile when the first determining unit is operated to determine that the personal details are not conformable to the requirement for being insurant.

The receiving unit may be operative to receive the driver's information from the memory device by performing wireless communications with the memory device.

The memorizing unit may be constituted by a detachable memory device previously having the automobile insurance information on the requirement for being insurant.

The warning apparatus may further comprise a communications unit operable in combination with a server having the automobile insurance information on the requirement for being insurant, the communications unit being operative to obtain the automobile insurance information from the server by performing communications with the server. The memorizing unit may be operative to have memorized therein the automobile insurance information obtained by the communications unit.

The first determining unit may be operative to determine whether or not the personal details are conformable to the requirement for being insurant on the basis of the automobile insurance information memorized in the memorizing unit when the automobile insurance information is not obtained from the server by the communications unit within a predetermined time period.

According to the seventh aspect of the present invention, there is provided a warning system, comprising: a server having automobile insurance information on a requirement for being insurant; and a warning apparatus to be installed into an automobile, the warning apparatus, including: a receiving unit for receiving the driver's information; a communications unit for obtaining the automobile insurance information from the server by performing communications with the server; a memorizing unit having memorized therein the automobile insurance information obtained by the communications unit; a first determining unit for determining whether or not the personal details are conformable to the requirement for being insurant by comparing the driver's information received by the receiving unit with the automobile insurance information obtained by the communications unit; and a warning unit for warning the driver on the basis of results determined by the first determining unit when the first determining unit is operated to determine that the personal details are not conformable to the requirement for being insurant.

The warning apparatus may further include a permission signal producing unit for producing a permission signal to permit the driver to operate the automobile when the first determining unit of the warning apparatus is operated to determine that the personal details are conformable to the requirement for being insurant.

The warning apparatus may further include a prevention signal producing unit for producing a prevention signal to prevent the driver from operating the automobile when the first determining unit of the warning apparatus is operated to determine that the personal details are not conformable to the requirement for being insurant.

The receiving unit of the warning apparatus may be operative to receive the driver's information by performing wireless communications.

The first determining unit of the warning apparatus may be operative to determine whether or not the personal details are conformable to the requirement for being insurant on the basis of the driver's information received by the receiving unit of the warning apparatus and the automobile insurance information memorized in the memorizing unit of the warning apparatus when the automobile insurance information is not obtained from the server by the communications unit of the warning apparatus within a predetermined time period.

The warning system may further comprise a memory device having driver's information on personal details. The receiving unit of the warning apparatus may be operative to receive the driver's information from the memory device.

The memory device may be constituted by an electronic key to the automobile.

The memory device may be constituted by an electronic driver's license having license information on the automobile.

The warning apparatus may further include a second determining unit for determining whether or not the license information is legitimate on the basis of the license information memorized in the electronic driver's license.

According to the eighth aspect of the present invention, there is provided a warning server, comprising: a communications unit for receiving driver's information on personal details; a memorizing unit having automobile insurance information on an insurance; and a first determining unit for determining whether or not the personal details are conformable to the requirement for being insurant by comparing the driver's information received by the communications unit with the automobile insurance information memorized in the memorizing unit, and the communications unit being operative to transmit results information on results determined by the first determining unit.

The warning server may further comprise a results information memorizing unit having memorized therein the results information on results determined by the first determining unit.

The communications unit may be operative to receive condition information on a start of the automobile. The results information storing unit may be operative to produce supervisory information on mutual relation between the results information memorized therein with the condition information received by the communications unit, and to have the supervisory information memorized therein.

The warning server may further comprise an accounting model deciding unit for deciding on an accounting model on the basis of the supervisory information memorized in the results information storing unit.

According to the ninth aspect of the present invention, there is provided a warning system, comprising: a warning apparatus to be installed into an automobile; and a waning server to be communicated with the warning apparatus, the warning server, including: a communications unit for receiving driver's information on personal details from the warning apparatus; a memorizing unit having automobile insurance information on an insurance; and a first determining unit for determining whether or not the personal details are conformable to the requirement for being insurant by comparing the driver's information received by the communications unit with the automobile insurance information memorized in the memorizing unit, and the warning apparatus including a warning unit for warning the driver on the basis of results determined by the first determining unit of the warning server when the first determining unit of the warning server is operated to determine that the personal details are conformable to the requirement for being insurant.

The warning apparatus may further include a permission signal producing unit for producing a permission signal to permit the driver to operate the automobile when the first determining unit of the warning server is operated to determine that the personal details are conformable to the requirement for being insurant.

The warning apparatus may further include a prevention signal producing unit for producing a prevention signal to prevent the driver from operating the automobile when the first determining unit of the warning server is operated to determine that the personal details are not conformable to the requirement for being insurant.

The warning server may further include a results information storing unit having memorized therein results information on results determined by the first determining unit of the warning server.

The communications unit of the warning server may be operative to receive condition information on a start of the automobile from the warning apparatus. The results information storing unit of the warning server may be operative to produce supervisory information on mutual relation between the results information memorized therein with the condition information received by the communications unit of the warning server, and to have the supervisory information memorized therein.

The warning server may further include an accounting model deciding unit for deciding on an accounting model on the basis of the supervisory information memorized in the results information storing unit.

The warning system may further comprise a memory device having driver's information on personal details. The receiving unit of the warning server may be operative to receive the driver's information from the memory device through the warning apparatus.

The memory device may be constituted by an electronic key to the automobile.

The memory device may be constituted by an electronic driver's license having license information on the automobile.

The warning server may further include a second determining unit for determining whether or not the license information is legitimate on the basis of the license information memorized in the electronic driver's license.

According to the tenth aspect of the present invention, there is provided an automobile, comprising: an engine control unit for controlling an engine; and a warning apparatus operable in combination with a memory device having driver's information on personal details, the warning apparatus, including: a receiving unit for receiving the driver's information from the memory device; a memorizing unit having automobile insurance information on a requirement for being insurant; a first determining unit for determining whether or not the personal details are conformable to the requirement for being insurant by comparing the driver's information received by the receiving unit with the automobile insurance information memorized in the memorizing unit; and a permission signal producing unit for producing a permission signal to permit the driver to operate the automobile when the first determining unit is operated to determine that the personal details are conformable to the requirement for being insurant, and the engine control unit is operative to have the engine start in response to the permission signal produced by the permission signal producing unit of the warning apparatus.

The warning apparatus may further include a warning unit for warning the driver on the basis of results determined by the first determining unit when the first determining unit is operated to determine that the personal details are not conformable to the requirement for being insurant.

The receiving unit of the warning apparatus may be operative to receive the driver's information from the memory device by performing wireless communications with the memory device.

The memorizing unit of the warning apparatus may be constituted by a detachable memory device previously having the automobile insurance information on the requirement for being insurant.

The warning apparatus may further include a communications unit operable in combination with a server having the automobile insurance information on the requirement for being insurant, the communications unit of the warning apparatus being operative to obtain the automobile insurance information from the server by performing communications with the server.

The memorizing unit of the warning apparatus may be operative to have memorized therein the automobile insurance information obtained by the communications unit of the warning apparatus.

The first determining unit of the warning apparatus may be operative to determine whether or not the personal details are conformable to the requirement for being insurant on the basis of the automobile insurance information memorized in the memorizing unit of the warning apparatus when the automobile insurance information is not obtained from the server by the communications unit of the warning apparatus within a predetermined time period.

BRIEF DESCRIPTION OF THE DRAWINGS

The features and advantages of a warning apparatus, a warning server, a warning system, and an automobile according to the present invention will be more clearly understood from the following description taken in conjunction with the accompanying drawings in which:

FIG. 7 is a schematic table showing supervisory information on mutual relation between results information memorized in the memorizing unit of the warning server according to the seventh embodiment of the present invention with condition information received by the communications unit of the warning server according to the seventh embodiment of the present invention.

DESCRIPTION OF THE EMBODIMENTS

Figure 1:
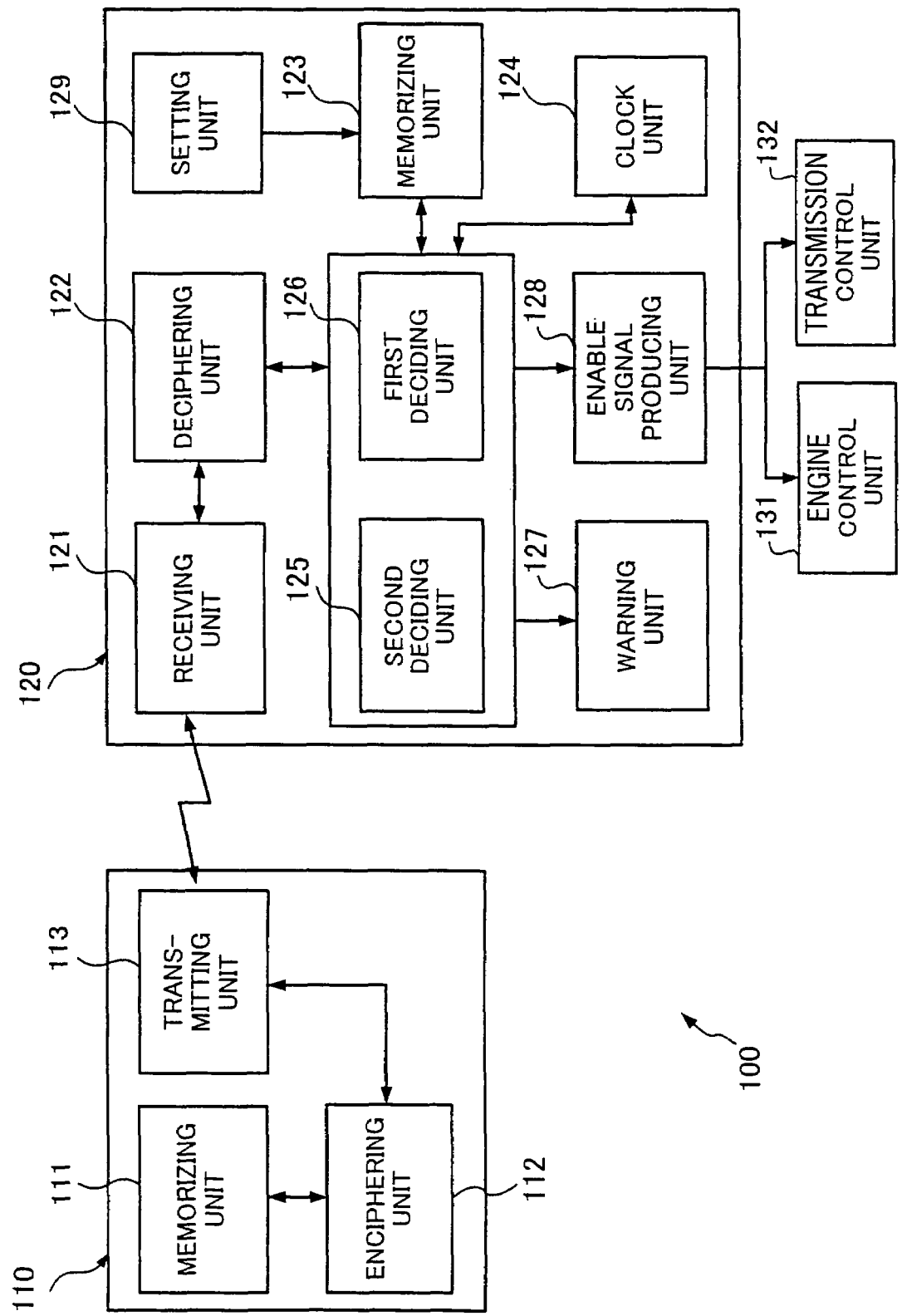
FIG. 1 is a block diagram of the warning system According to the first to third embodiments of the present invention.

Throughout the following detail description, similar reference characters and numbers refer to similar parts and elements in all figures of the drawings.

Referring now to FIG. 1 of the drawings, there is shown a first embodiment of the warning system according to the present invention. The warning system is shown in FIG. 1 as having a reference number 100, and comprises an electronic driver's license 110, and a warning apparatus 120 to be installed into an automobile, and adapted to communicate with the electronic driver's license 110 to be carried with a driver.

The electronic driver's license 110 includes a memorizing unit 111 for having driver's information on personal details of the driver and driver's license, an enciphering unit 112 for enciphering the driver's information memorized in the memorizing unit 111, and a transmitting unit 113 for transmitting the driver's information enciphered by the enciphering unit 112 to the warning apparatus 120 by communicating with the warning apparatus 120.

The warning apparatus 120 includes a receiving unit 121 for receiving the enciphered driver's information from the electronic driver's license 110 by communicating with the electronic driver's license 110, a deciphering unit 122 for deciphering the enciphered driver's information received from the electronic driver's license 110, a memorizing unit 123 having automobile insurance information on a requirement for being insurant, a clock unit 124 for producing date information on current date and hour, a second determining unit 125 for determining whether or not the driver's license is legitimate on the basis of the driver's information received from the electronic driver's license 110, a first determining unit 126 for determining whether or not the personal details of the driver is conformable to the requirement for being insurant on the basis of the driver's information received from the electronic driver's license 110 and the automobile insurance information memorized in the memorizing unit 123, and a warning unit 127 for warning the driver on the basis of results determined by the second determining unit 125 and results determined by the first determining unit 126.

The warning unit 127 of the warning apparatus 120 is operative to warn the driver on the basis of results determined by the second determining unit 125 of the warning apparatus 120 when the second determining unit 125 of the warning apparatus 120 is operated to determine that the driver's license is not legitimate. In the similar manner, the warning unit 127 of the warning apparatus 120 is operative to warn the driver on the basis of results determined by the first determining unit 126 of the warning apparatus 120 when the first determining unit 126 of the warning apparatus 120 is operated to determine that the personal details of the driver is not conformable to the requirement for being insurant.

The warning apparatus 120 further includes a permission signal producing unit 128 for producing a permission signal to permit the driver to operate the automobile when the first determining unit 126 of the warning apparatus 120 is operated to determine that the personal details of the driver is conformable to the requirement for being insurant, and a setting unit 129 for allowing the memorizing unit 123 to have memorized therein detailed information on, for example, the names of the restricted members with respect to family rider.

The personal details includes one's name, one's address, the expiration date of the driver's license, the registration number of the driver's license, the classification of the driver's license, the point for the driving infraction, and others.

The requirement for being insurant includes the name of a covenantee, vehicle's details, the expiration date of the insurance, age restriction, the family rider, the maximum limit of the insurance, and others.

The second determining unit 125 of the warning apparatus 120 is operative to determine whether or not the driver's information received from the electronic driver's license 110 is represented by unlawful format. The second determining unit 125 of the warning apparatus 120 is operative to determine whether or not the driver's information received from the electronic driver's license 110, for example, the point for the driving infraction is smaller than a predetermined point. The second determining unit 125 of the warning apparatus 120 is operative to determine whether or not the driver's information, for example, the classification of the driver's license is conformable to the type of the automobile. The second determining unit 125 of the warning apparatus 120 is operative to determine whether or not the driver's information, for example, the expiration date of the driver's license has passed on the basis of the date information produced by the clock unit 124 of the warning apparatus 120.

The first determining unit 126 of the warning apparatus 120 is operative to determine whether or not the driver's information, for example, the driver's age is conformable to the requirement for being insurant on the basis of the automobile insurance information memorized in the memorizing unit 123 of the warning apparatus 120. The first determining unit 126 of the warning apparatus 120 is operative to determine whether or not the driver's information, for example, the driver's name is conformable to the requirement for being insurant, to determine whether or not the driver's name is the same as the name of the covenantee, and to determine whether or not driver's name is conformable to the names of the restricted members with respect to the family rider on the basis of the automobile insurance information memorized in the memorizing unit 123 of the warning apparatus 120. The first determining unit 126 of the warning apparatus 120 is operative to determine whether or not the expiration date of the insurance has passed on the basis of the automobile insurance information memorized in the memorizing unit 123 of the warning apparatus 120 and the date information produced by the clock unit 124 of the warning apparatus 120.

The warning unit 127 of the warning apparatus 120 is operative to warn the driver, for example, by displaying on a screen the results determined by the second determining unit 125, i.e., "the unlawful driver's license" and others, and by displaying on the screen the results determined by the first determining unit 126 of the warning apparatus 120, i.e., "the personal details of the driver is not conformable to the requirement for being insurant" and others.

The warning unit 127 of the warning apparatus 120 is operative to warn the driver, for example, by outputting a sound in association with the results determined by the second determining unit 125, i.e., "the unlawful driver's license" and others, and by outputting a sound in association with the results determined by the first determining unit 126 of the warning apparatus 120, i.e., "the personal details of the driver is not conformable to the requirement for being insurant" and others.

The setting unit 129 of the warning apparatus 120 is operative to allow the memorizing unit 123 of the warning apparatus 120 to have memorized therein the detailed information on, for example, the names of the restricted members with respect to the family rider. This leads to the fact that the first determining unit 126 of the warning apparatus 120 can accurately determine whether or not the personal details of the driver is conformable to the requirement for being insurant on the basis of the detailed information memorized in the memorizing unit 123 of the warning apparatus 120.

On the other hand, the warning unit 127 of the warning apparatus 120 is operative to warn and demand the detailed information when the names of the restricted members with respect to the family rider is not memorized in the memorizing unit 123 of the warning apparatus 120.

The first determining unit 126 of the warning apparatus 120 is operative to determine whether or not the driver's name is conformable to the names of the restricted members with respect to the family rider on the basis of the automobile insurance information and the detailed information memorized in the memorizing unit 123 of the warning apparatus 120, and the driver is not the same as the assured person.

The warning unit 127 of the warning apparatus 120 is operative to warn the driver about the family rider and other contract basis of the insurance, for example, the driver who is separated from his or her spouse being not conformable to the family rider.

The following description will be directed to the operation of the first embodiment of the warning apparatus according to the present invention.

The driver's information on the personal details and the driver's license memorized in the memorizing unit 111 of the electronic driver's license 110 to be carried with the driver is firstly enciphered by the enciphering unit 112 of the electronic driver's license 110 when the driver gets in the automobile. The enciphered driver's information is then transmitted to the receiving unit 121 of the warning apparatus 120 by the transmitting unit 113 of the electronic driver's license 110, while the enciphered driver's information is received by the receiving unit 121 of the warning apparatus 120, and deciphered by the deciphering unit 122 of the warning apparatus 120.

The second determining unit 125 of the warning apparatus 120 is then operated to determine whether or not the driver's license is legitimate on the basis of the driver's information received from the electronic driver's license 110.

Here, the clause "the driver's license is legitimate" intends to indicate the effect that the driver's information received from the electronic deriver's license 110 is represented by the lawful format, the point for the driving infraction is smaller than the predetermined point, the classification of the driver's license is conformable to the type of the automobile, the driver's license has not expired yet.

When the second determining unit 125 of the warning apparatus 120 is then operated to determine whether or not the driver's license is not legitimate on the basis of the driver's information received from the electronic driver's license 110, the warning unit 127 of the warning apparatus 120 is firstly operated to warn the driver on the basis of results determined by the second determining unit 125 of the warning apparatus 120. The prevention signal producing unit 128 of the warning apparatus 120 is then operated to fail to produce the permission signal, i.e., to assume "OFF" operational state to-prevent the driver from operating the automobile.

When, on the other hand, the second determining unit 125 of the warning apparatus 120 is operated to determine whether or not the driver's license is legitimate on the basis of the driver's information received from the electronic driver's license 110, the first determining unit 126 of the warning apparatus 120 is operated to determine whether or not the personal details of the driver is conformable to the requirement for being insurant on the basis of the driver's information received from the electronic driver's license 110, the automobile insurance information memorized in the memorizing unit 123 of the warning apparatus 120, the date information produced by the clock unit 124 of the warning apparatus 120.

The first determining unit 126 of the warning apparatus 120 is operated to determine on whether or not the personal details of the driver, for example, the driver's age is conformable to the requirement for being insurant on the basis of the driver's information received from the electronic driver's license 110, the automobile insurance information memorized in the memorizing unit 123 of the warning apparatus 120, the date information produced by the clock unit 124 of the warning apparatus 120.

The first determining unit 126 of the warning apparatus 120 is operated to determine whether or not the personal details of the driver, for example, the driver's name is conformable to the requirement for being insurant on the basis of the driver's information received from the electronic driver's license 110, the automobile insurance information memorized in the memorizing unit 123 of the warning apparatus 120, the date information produced by the clock unit 124 of the warning apparatus 120.

The first determining unit 126 of the warning apparatus 120 is operated to determine whether or not the personal details of the driver, for example, the driver's license has expired on the basis of the automobile insurance information memorized in the memorizing unit 123 of the warning apparatus 120 and the date information produced by the clock unit 124 of the warning apparatus 120.

When the second determining unit 125 of the warning apparatus 120 is operated to determine whether or not the driver's license is legitimate on the basis of the driver's information received from the electronic driver's license 110, the warning unit 127 of the warning apparatus 120 is operated to warn the driver on the basis of results determined by the first determining unit 126 of the warning apparatus 120. The permission signal producing unit 128 of the warning apparatus 120 is operated to assume "OFF" state to fail to produce the permission signal to prevent the driver from operating the automobile.

While there has been described in the present embodiment about the fact that the warning apparatus 120 includes a permission signal producing unit 128 for producing a permission signal to permit the driver to operate the automobile when the first determining unit 126 of the warning apparatus 120 is operated to determine that the personal details of the driver is conformable to the requirement for being insurant, the permission signal producing unit 128 may be replaced by a prevention signal producing unit for producing a prevention signal to prevent the driver from operating the automobile when the first determining unit 126 of the warning apparatus 120 is operated to determine that the personal details are not conformable to the requirement for being insurant.

The warning apparatus constructed as previously mentioned can prevent the automobile from being started and operated by the driver who is not conformable to the requirement for being insurant when the prevention signal producing unit is operated to assume "ON" state to produce the prevention signal to prevent the driver from operating the automobile.

In the above embodiment, the warning apparatus 120 is installed into an automobile, however, the automobile may comprise a warming apparatus 100 for communicating with the electronic driver's license 110, and preventing the automobile from being started and driven by the unqualified driver.

The warning apparatus may further include a control signal producing unit for producing a control signal in response to results determined by the first determining unit 126 of the warning apparatus 120. The automobile may be immobilized by each of the engine control unit 131 and the transmission control unit 132 in response to the control signal produced by the control signal producing unit when the first determining unit 126 of the warning apparatus 120 that the personal details of the driver is not conformable to the requirement for being insurant.

From the above detailed description, it will be understood that the warning apparatus 120 can prevent the automobile from being started and driven by the unqualified driver, such as for example a driver who is not conformable to the requirement for being insurant, by including a receiving unit 121 for receiving the driver's information from the electronic driver's license 110, a first determining unit 126 for determining whether or not the personal details of the driver is conformable to the requirement for being insurant on the basis of the driver's information received from the electronic driver's license 110, and a warning unit 127 for warning the driver on the basis of results determined by the first determining unit 126.

The warning apparatus 120 can decide whether or not to immobilize the automobile by determining whether or not the personal details of the driver is conformable to the requirement for being insurant with relatively high accuracy.

The warning apparatus 120 can completely immobilize the automobile by reason that the permission signal producing unit 128 of the warning apparatus 120 is operative to assume the "OFF" state to immobilize the automobile in combination with the engine control unit 131 and the transmission control unit 132 of the automobile when the first determining unit 126 of the warning apparatus 120 that the personal details of the driver is not conformable to the requirement for being insurant on the basis of the driver's information received from the electronic driver's license 110.

The electronic driver's license 100 may be constituted by a contact-free IC card. The receiving unit 121 of the warning apparatus 120 may be operative to receive the driver's information on the personal details of the driver by performing wireless communications with the contact-free IC card. The warning apparatus constructed as previously mentioned can determine whether or not the personal details of the driver is conformable to the requirement for being insurant, and can prevent the automobile from being started and operated by the driver who is not conformable to the requirement for being insurant by reason that the receiving unit 121 is operative to receive the personal details of the driver from the contact-free IC card by performing wireless communications with the contact-free IC card.

The warning apparatus may comprises a receiving unit for receiving a driver's information from a memory device memorizing the drover's information; a memorizing unit for memorizing an automobile insurance information; a determining unit for determining whether or not the driver is an insurant on the basis of the driver's information and the automobile insurance information; and a warning unit for warning the driver not to drive when the determining unit has determined that the driver is not the insurant. The warning apparatus may further comprise a permission signal producing unit for producing a permission signal to permit the driver to operate the automobile when the determining unit has determined that the driver is the insurant. The warning apparatus may further comprise a prevention signal producing unit for producing a prevention signal to prevent the driver from operating the automobile when the determining unit has determined that the driver is not the insurant.

The receiving unit may be operative to receive the driver's information from the memory device by performing wireless communications with the memory device. The memorizing unit may be constituted of a detachable memory device having memorized the automobile insurance information. The warning apparatus may further comprise a communications unit for obtaining an automobile insurance information from the server memorizing the automobile insurance information. The memorizing unit may be operative to memorize the automobile insurance information obtained by the communications unit. The determining unit may be operative to determine whether or not the driver is an insurant on the basis of the automobile insurance information memorized in the memorizing unit when the determining unit has determined that the driver is not the insurant.

Although there has been described in the above about the first embodiment of the warning system according to the present invention, this embodiment may be replaced by the second to seventh embodiments of the warning system according to the present invention in order to attain the objects of the present invention. The second to seventh embodiments of the warning system will now be described hereinafter.

Referring then to FIGS. 1 to 3, and 5 of the drawings, there are shown block diagrams of the second to seventh embodiments of the warning system according to the present invention. The constitutional elements and the steps of the second to seventh embodiments of the warning system according to the present invention as shown in FIGS. 1 to 3, and 5 are entirely the same as those of the first embodiment of the warning system according to the present invention as shown in FIG. 1 except for the constitutional elements and the steps appearing in the following description. Therefore, only the constitutional elements and the steps of the second to seventh embodiments of the warning system different from those of the first embodiment of the warning system will be described in detail hereinafter. The constitutional elements and the steps of the second to seventh embodiments of the warning system entirely the same as those of the first embodiment of the warning system will not be described but bear the same reference numerals and legends as those of the first embodiment of the warning system in FIG. 1 to avoid tedious repetition.

The following description will be directed to the constitutional elements and the steps of the second embodiment of the warning system different from those of the first embodiment of the warning system.

The warning system is shown in FIG. 1 as having a reference number 100, and comprises an electronic driver's license 110, and a warning apparatus 120 to be installed into an automobile, and adapted to communicate with the electronic driver's license 110 to be carried with a driver.

The electronic driver's license 110 includes a memorizing unit 111 for having driver's information on personal details of the driver and driver's license, an enciphering unit 112 for enciphering the driver's information memorized in the memorizing unit 111, and a transmitting unit 113 for transmitting the driver's information enciphered by the enciphering unit 112 to the warning apparatus 110. The memorizing unit 111 of the electronic driver's license 110 further has memorized therein automobile insurance information on a requirement for being insurant.

The first determining unit 126 of the warning apparatus 120 is operative to determine whether or not the personal details of the driver is conformable to the requirement for being insurant on the basis of the driver's information and the automobile insurance information received from the electronic driver's license 110 and the date information produced by the clock unit 124 of the warning apparatus 120.

The first determining unit 126 of the warning apparatus 120 is operative to determine whether or not the personal details of the driver, for example, the driver's age is conformable to the requirement for being insurant on the basis of the driver's information and the automobile insurance information received from the electronic driver's license 110 and the date information produced by the clock unit 124 of the warning apparatus 120.

The first determining unit. 126 of the warning apparatus 120 is operative to determine whether or not the personal details of the driver, for example, the driver's name is conformable to the requirement for being insurant, i.e., the driver is conformable to the covenantee of the insurance on the basis of the driver's information and the automobile insurance information received from the electronic driver's license 110 and the date information produced by the clock unit 124 of the warning apparatus 120.

The first determining unit 126 of the warning apparatus 120 is operative to determine whether or not the personal details of the driver, for example, the driver is conformable to the family rider of the insurance on the basis of the driver's information and the automobile insurance information received from the electronic driver's license 110 and the date information produced by the clock unit 124 of the warning apparatus 120 when the first determining unit 126 of the warning apparatus 120 is operated to determine that the driver is not conformable to the covenantee of the insurance.

The first determining unit 126 of the warning apparatus 120 is operative to determine whether or not the expiration date of the insurance has not passed yet on the basis of the automobile insurance information received from the electronic driver's license 110 and the date information produced by the clock unit 124 of the warning apparatus 120.

The following description will now be directed to the operation of the warning system according to the second embodiment of the present invention.

The first determining unit 126 of the warning apparatus 120 is operated to determine whether or not the personal details of the driver is conformable to the requirement for being insurant on the basis of the driver's information received from the electronic driver's license 110, the automobile insurance information memorized in the memorizing unit 123 of the warning apparatus 120, the date information produced by the clock unit 124 of the warning apparatus 120.

When the first determining unit 126 of the warning apparatus 120 is operated to determine whether or not the personal details of the driver is conformable to the contract, the permission signal producing unit 128 of the warning apparatus 120 is operated to produce the permission signal to permit the driver to operate the automobile.

When, on the other hand, the first determining unit 126 of the warning apparatus 120 is operated to determine on whether or not the personal details of the driver is not conformable to the contract, the warning unit 127 of the warning apparatus 120 is operated to warn the driver on the basis of results determined by the determining unit 126 of the warning apparatus 120. The permission signal producing unit 128 of the warning apparatus 120 is then operated to assume "OFF" state to prevent the driver from operating the automobile when the first determining unit 126 of the warning apparatus 120 is operated to determine that the personal details of the driver is not conformable to the requirement for being insurant.

While there has been described in the present embodiment about the fact that the warning apparatus 120 includes a permission signal producing unit 128 for producing a permission signal to permit the driver to operate the automobile when the first determining unit 126 of the warning apparatus 120 is operated to determine that the personal details of the driver is conformable to the requirement for being insurant, the permission signal producing unit 128 may be replaced by a prevention signal producing unit for producing a prevention signal to prevent the driver from operating the automobile when the first determining unit 126 of the warning apparatus 120 is operated to determine that the personal details are not conformable to the requirement for being insurant.

The warning apparatus constructed as previously mentioned can prevent the automobile from being started and operated by the driver who is not conformable to the requirement for being insurant when the prevention signal producing unit is operated to assume "ON" state to produce the prevention signal to prevent the driver from operating the automobile.

In the above embodiment, the warning apparatus 120 is installed into an automobile, however, the automobile may comprise a warming apparatus 100 for communicating with the electronic driver's license 110, and preventing the automobile from being started and driven by the unqualified driver.

The warning apparatus may further include a control signal producing unit for producing a control signal in response to results determined by the first determining unit 126 of the warning apparatus 120. The automobile may be immobilized by each of the engine control unit 131 and the transmission control unit 132 in response to the control signal produced by the control signal producing unit when the first determining unit 126 of the warning apparatus 120 is operated to determine that the personal details of the driver is not conformable to the requirement for being insurant.

From the above detailed description, it will be understood that the warning apparatus 120 can prevent the automobile from being started and driven by the unqualified driver, such as for example a driver who is not conformable to the requirement for being insurant, by including a receiving unit 121 for receiving the driver's information and the automobile insurance information from the electronic driver's license 110, a first determining unit 126 for determining whether or not the personal details of the driver is conformable to the requirement for being insurant on the basis of the driver's information and the automobile insurance information received from the electronic driver's license 110, and a warning unit 127 for warning the driver on the basis of results determined by the first determining unit 126.

The warning apparatus 120 can decide whether or not to immobilize the automobile by determining whether or not the personal details of the driver is conformable to the requirement for being insurant with relatively high accuracy.

The warning apparatus 120 can completely immobilize the automobile by reason that the permission signal producing unit 128 of the warning apparatus 120 is operative to assume the "OFF" state to immobilize the automobile in combination with the engine control unit 131 and the transmission control unit 132 of the automobile when the first determining unit 126 of the warning apparatus 120 is operated to determine that the personal details of the driver is not conformable to the requirement for being insurant on the basis of the driver's information received from the electronic driver's license 110.

The electronic driver's license 100 may be constituted by a contact-free IC card. The receiving unit 121 of the warning apparatus 120 may be operative to receive the driver's information on the personal details of the driver by performing wireless communications with the contact-free IC card. The warning apparatus constructed as previously mentioned can determine whether or not the personal details of the driver is conformable to the requirement for being insurant, and can prevent the automobile from being started and operated by the driver who is not conformable to the requirement for being insurant by reason that the receiving unit 121 is operative to receive the personal details of the driver from the contact-free IC card by performing wireless communications with the contact-free IC card.

Referring now to FIG. 1 of the drawings, there is shown a third embodiment of the warning system according to the present invention.

The warning system is shown in FIG. 1 as having a reference number 100, and comprises an electronic driver's license 110, and a warning apparatus 120 to be installed into an automobile, and adapted to communicate with the electronic driver's license 110 to be carried with the driver.

The memorizing unit 111 of the electronic driver's license 110 has driver's information on personal details and driver's license. The memorizing unit 123 of the warning apparatus 120 previously has automobile insurance information on a requirement for being insurant. The first determining unit 126 of the warning apparatus 120 is operative to determine whether or not the driver is conformable to the requirement for being insurant on the basis of the driver's information and the automobile insurance information received from the electronic driver's license 110, the automobile insurance information memorized in the memorizing unit 123 of the warning apparatus 120, the date information produced by the clock unit 124 of the warning apparatus 120.

In addition to the judgment performed by the first determining unit 126 of the warning apparatus 120 of the warning system 100 according to the first embodiment of the present invention, the first determining unit 126 of the warning apparatus 120 is operative to determine whether or the personal details of the driver is conformable to the requirement for being insurant on the basis of the automobile insurance information memorized in the memorizing unit 123, and determine whether or not the vehicle details of the automobile is conformable to the requirement for being insurant taken out on the driver on the basis of the automobile insurance information received from the electronic driver's license.

The warning unit 127 of the warning apparatus 120 is operative not to warn the driver when the first determining unit 126 of the warring apparatus 120 is operated to determine that the personal details of the driver is not conformable to the requirement for being insurant, and the vehicle details of the automobile is conformable to the requirement for being insurant taken out on the driver.

The first determining unit 126 of the warning apparatus 120 is operative to determine whether or the maximum limits of the insurance is larger than a predetermined value on the basis of the automobile insurance information memorized in the memorizing unit 123, and determine whether or not the maximum limits of the insurance taken out on the driver is larger than a predetermined value on the basis of the automobile insurance information received from the electronic driver's license.

The warning unit 127 of the warning apparatus 120 is operative to warn the driver about the effect that the maximum limit of the insurance is not larger than the predetermined value when the first determining unit 126 of the warning apparatus 120 is operative to determine that the personal details are conformable to the requirement for being insurant, and the maximum limits of the insurance is not larger than the predetermined value.

The permission signal producing unit 128 of the warning apparatus 120 is operative to assume OFF state to fail to produce the permission signal, i.e., to immobilize the automobile in combination with the engine control unit 131 and the transmission control unit 132 when the first determining unit 126 of the warning apparatus 120 is operative to determine that the personal details are conformable to the requirement for being insurant, and the maximum limits of the insurance is not larger than the predetermined value.

While there has been described in the present embodiment about the fact that the warning apparatus 120 includes a permission signal producing unit 128 for producing a permission signal to permit the driver to operate the automobile when the first determining unit 126 of the warning apparatus 120 is operated to determine that the personal details of the driver is conformable to the requirement for being insurant, the permission signal producing unit 128 may be replaced by a prevention signal producing unit for producing a prevention signal to prevent the driver from operating the automobile when the first determining unit 126 of the warning apparatus 120 is operated to determine that the personal details are not conformable to the requirement for being insurant.

The warning apparatus constructed as previously mentioned can prevent the automobile from being started and operated by the driver who is not conformable to the requirement for being insurant when the prevention signal producing unit is operated to assume "ON" state to produce the prevention signal to prevent the driver from operating the automobile.

In the above embodiment, the warning apparatus 120 is installed into an automobile, however, the automobile may comprise a warming apparatus 100 for communicating with the electronic driver's license 110, and preventing the automobile from being started and driven by the unqualified driver.

The warning apparatus may further include a control signal producing unit for producing a control signal in response to results determined by the first determining unit 126 of the warning apparatus 120. The automobile may be immobilized by each of the engine control unit 131 and the transmission control unit 132 in response to the control signal produced by the control signal producing unit when the first determining unit 126 of the warning apparatus 120 is operated to determine that the personal details of the driver is not conformable to the requirement for being insurant.

From the above detailed description, it will be understood that the warning apparatus 120 can prevent the automobile from being started and driven by the unqualified driver, such as for example a driver who is not conformable to the requirement for being insurant, by including a receiving unit 121 for receiving the driver's information and the automobile insurance information from the electronic driver's license 110, a first determining unit 126 for determining whether or not the personal details of the driver is conformable to the requirement for being insurant on the basis of the driver's information and the automobile insurance information received from the electronic driver's license 110, and a warning unit 127 for warning the driver on the basis of results determined by the first determining unit 126.

The warning apparatus 120 can decide whether or not to immobilize the automobile by determining whether or not the personal details of the driver is conformable to the requirement for being insurant with relatively high accuracy.

The warning apparatus 120 can completely immobilize the automobile by reason that the permission signal producing unit 128 of the warning apparatus 120 is operative to assume the "OFF" state to immobilize the automobile in combination with the engine control unit 131 and the transmission control unit 132 of the automobile when the first determining unit 126 of the warning apparatus 120 is operated to determine that the personal details of the driver is not conformable to the requirement for being insurant on the basis of the driver's information received from the electronic driver's license 110.

The electronic driver's license 100 may be constituted by a contact-free IC card. The receiving unit 121 of the warning apparatus 120 may be operative to receive the driver's information on the personal details of the driver by performing wireless communications with the contact-free IC card. The warning apparatus constructed as previously mentioned can determine whether or not the personal details of the driver is conformable to the requirement for being insurant, and can prevent the automobile from being started and operated by the driver who is not conformable to the requirement for being insurant by reason that the receiving unit 121 is operative to receive the personal details of the driver from the contact-free IC card by performing wireless communications with the contact-free IC card.

Figure 2:
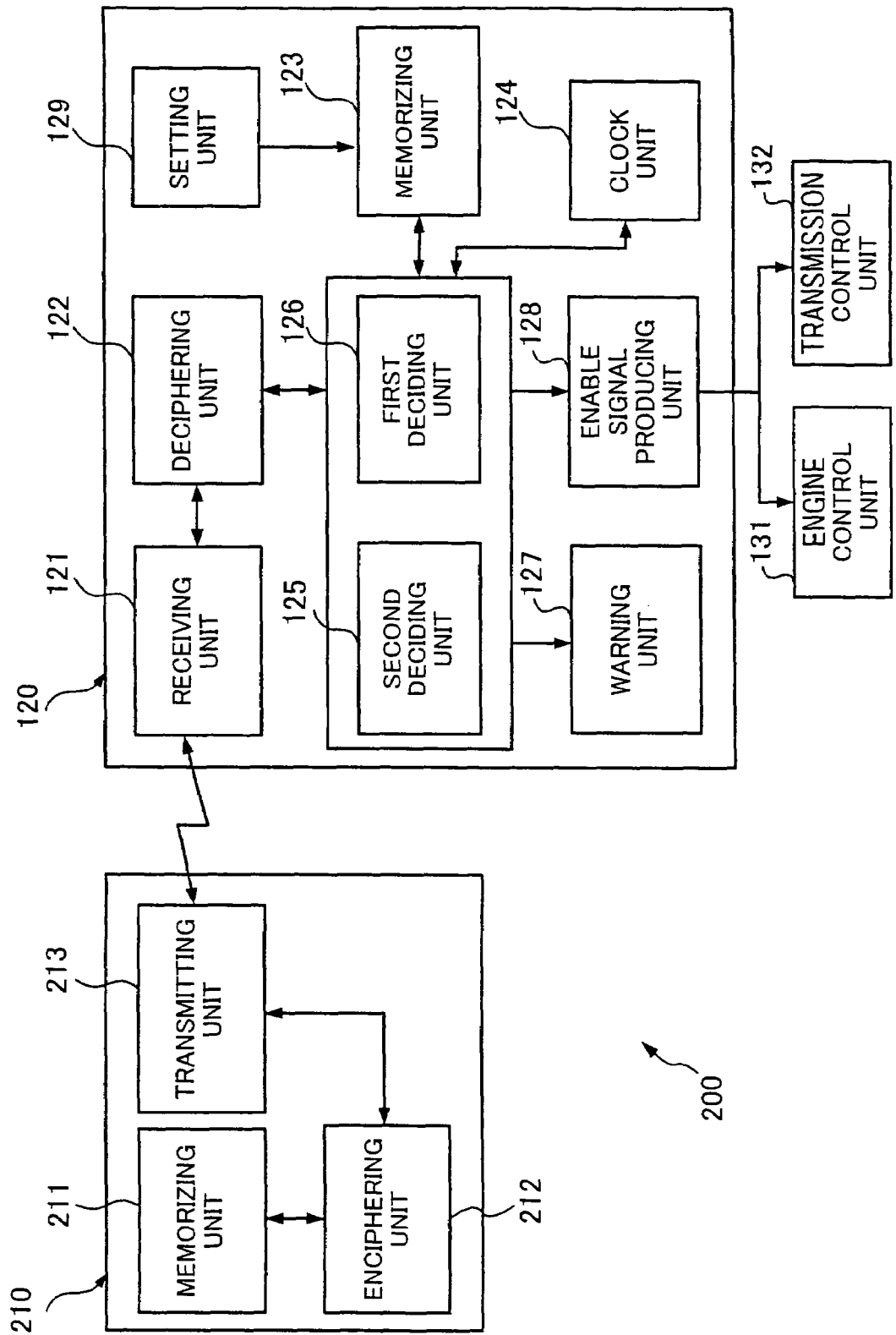
FIG. 2 is a block diagram of the warning system according to the fourth and fifth embodiments of the present invention.

Referring now to FIG. 2 of the drawings, there is shown a fourth embodiment of the warning system according to the present invention.

The warning system is shown in FIG. 2 as having a reference number 200, and comprises an electronic key 210 to an automobile, and a warning apparatus 120 to be installed into the automobile, and adapted to communicate with the electronic key 210.

The electronic key 210 includes a memorizing unit 211 for having memorized therein driver's information on personal details and driver's license, an enciphering unit 212 for enciphering the driver's information memorized in the memorizing unit 211, and a transmitting unit 213 for transmitting the driver's information enciphered by the enciphering unit 212 to the warning apparatus 120. The personal details includes one's name, the date of one's birth, and so on.

The warning apparatus 120 comprises a receiving unit 121 for receiving the driver's information from the electronic key 210, a deciphering unit 122 for deciphering the driver's information enciphered by the enciphering unit 212 of the electronic key 210, a memorizing unit 123 having memorized therein automobile insurance information on a requirement for being insurant, a clock unit 124 for producing time information on current date and hour, a first determining unit 126 for determining whether or not the personal details are conformable to the requirement for being insurant on the basis of the driver's information received from the electronic key 210 and the automobile insurance information memorized in the memorizing unit 123, and a warning unit 127 for warning the driver on the basis of results determined by the first determining unit 126 when the first determining unit 126 is operated to determine that the personal details are not conformable to the requirement for being insurant, and a permission signal producing unit 128 for producing a permission signal to permit the driver to start an engine of the automobile when the first determining unit 126 is operated to determine that the personal details are conformable to the requirement for being insurant, and a setting unit 129 for setting supplemental information in the memorizing unit 123.

While there has been described in the fourth embodiment about the fact that the warning apparatus 120 includes the permission signal producing unit 128 for producing a permission signal to permit the driver to start an engine of the automobile when the first determining unit 126 of the warning apparatus 120 is operated to determine that the personal details are conformable to the requirement for being insurant, the permission signal producing unit 128 may be replaced by a prevention signal producing unit for producing a prevention signal to fait to permit the driver to operate the automobile.

In the similar manner of the warning apparatus 120 of the warning system 100 according to the first embodiment, the warning apparatus 120 of the warning system 200 according to the fourth embodiment is operative to receive the driver's information and the license information form the electronic driver's license, and receive the drover's information except for the license information. The memorizing unit 211 of the electronic key 210 previously and further has identity information indicative of the key to the automobile, while the warning apparatus 120 of the warning system 200 according to the fourth embodiment is further operative to receive the identity information from the electronic key 210 before determining whether or not to recognize as the electronic key 210 on the basis of the identical information received from the electronic key 210.

Referring now to FIG. 2 of the drawings, there is shown a fifth embodiment of the warning system according to the present invention.

In this embodiment, the electronic key 210 includes a memorizing unit 211 for previously having driver's information on personal details and driver's license and automobile insurance information on a contract basis of an automotive insurance, an enciphering unit 212 for enciphering the driver's information and the license information memorized in the memorizing unit 212, and a transmitting unit 213 for transmitting the driver's information and the license information enciphered by the enciphering unit 212 to the warning apparatus 120.

The first determining unit 126 of the warning apparatus 120 is operative to determine whether or not the personal details are conformable to the requirement for being insurant on the basis of the driver's information and the automobile insurance information received from the electronic key 210 and the date information produced by the clock unit 124.

In the first to fourth embodiments of the warning system according to the present invention, the memorizing unit 123 of the warning apparatus 120 may have only the automobile insurance information on contract basis of compulsory insurance, i.e., compulsory automotive liability insurance. The memorizing unit 123 of the warning apparatus 120 may have only the automobile insurance information on contract basis of voluntary insurance. The memorizing unit 123 of the warning apparatus 120 preferably have both the automobile insurance information on the contract basis of the compulsory insurance and the automobile insurance information on the contract basis of the voluntary insurance. The first determining unit 126 of the warning apparatus 120 is preferably operative to determine whether or not the personal details are conformable to the requirement for being insurant on the basis of both the contract basis of the compulsory insurance and the automobile insurance information on the contract basis of the voluntary insurance.

Here, the automobile insurance may have an insurance taken out on the automobile. On the other hand, the automobile insurance may have an insurance taken out on the driver. The first determining unit is operative to determine whether or not the personal details are conformable to age restriction, family rider, expiration date, and other contract basis. The warning unit 127 is operative to warn the driver about the expiration date of the automobile insurance, for example, to display on the screen "your driver's license will expire within a month".

The permission signal producing unit 128 is operative to assume two different operational states consisting of "ON" state to produce the permission signal to permit the driver to operate the automobile, and "OFF" state to fail to produce the permission signal to permit the driver to operate the automobile.

Here, the setting unit 129 may be operative to selectively set the operational states of the permission signal producing unit 128. The permission signal producing unit 128 of the warning apparatus 120 may be replaced by a prevention signal producing unit for producing a prevention signal to prevent the driver from operating the automobile.

From the above detail description, it will be understood that the warning apparatus can prevent the automobile from being started to be operated by the driver who is not conformable to the requirement for being insurant by reason that the permission signal producing unit is operative to assume "OFF" state to fail to produce the permission signal when the first determining unit 126 is operated to determine that the personal details are not conformable to the requirement for being insurant.

The warning apparatus can prevent the automobile from being started to be operated by the driver who is not conformable to the requirement for being insurant by reason that the warning unit is operative to warn the driver on the basis of results determined by the first determining unit 126 when the first determining unit 126 is operated to determine that the personal details are not conformable to the requirement for being insurant. The warning apparatus ensures to have the driver recognize about the effect that the driver is not conformable to the requirement for being insurant if the automobile can be started to be operated by the driver who is not conformable to the requirement for being insurant.

Figure 3:
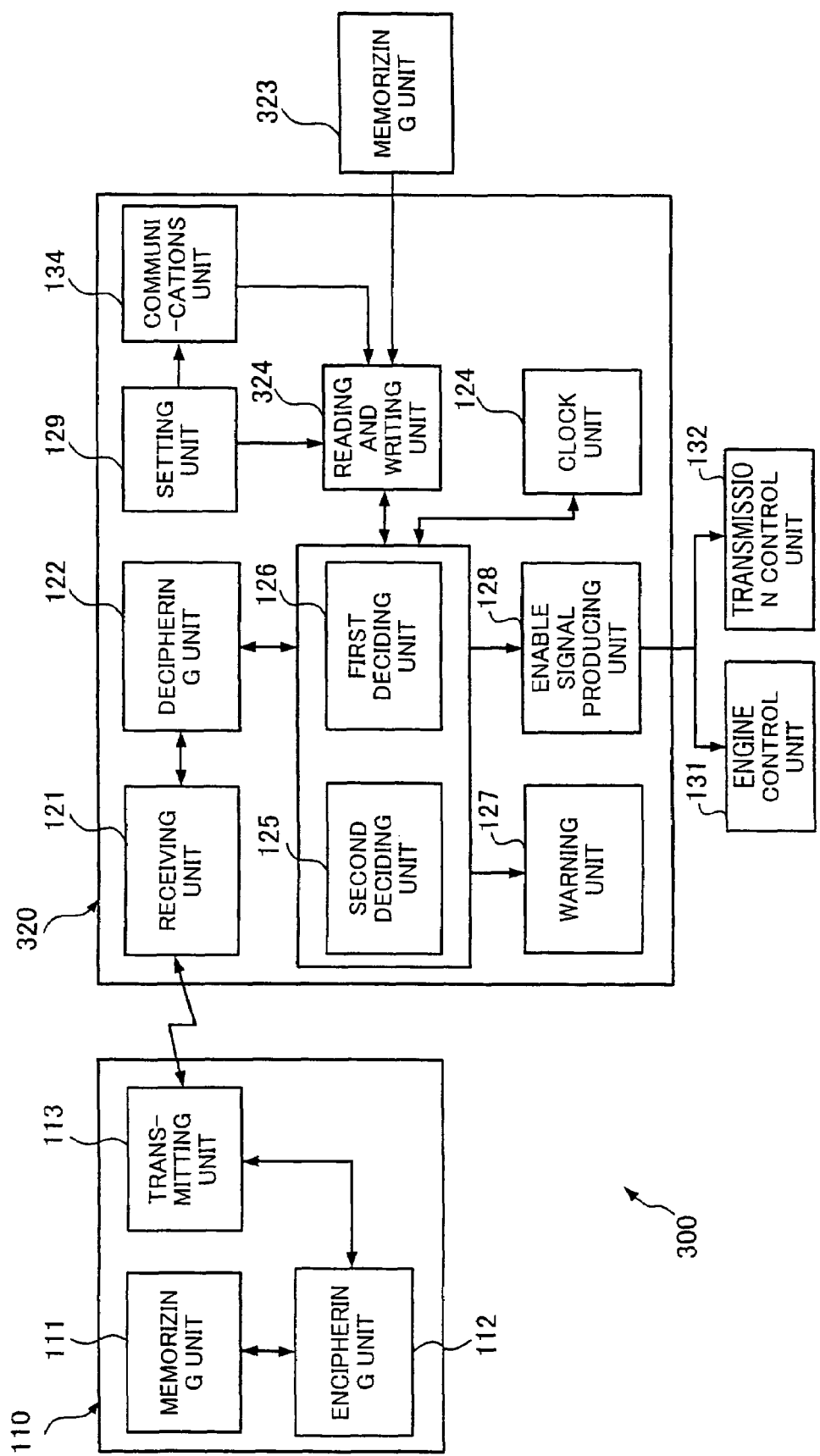
FIG. 3 is a block diagram of the warning system according to the sixth embodiment of the present invention.
Figure 4:
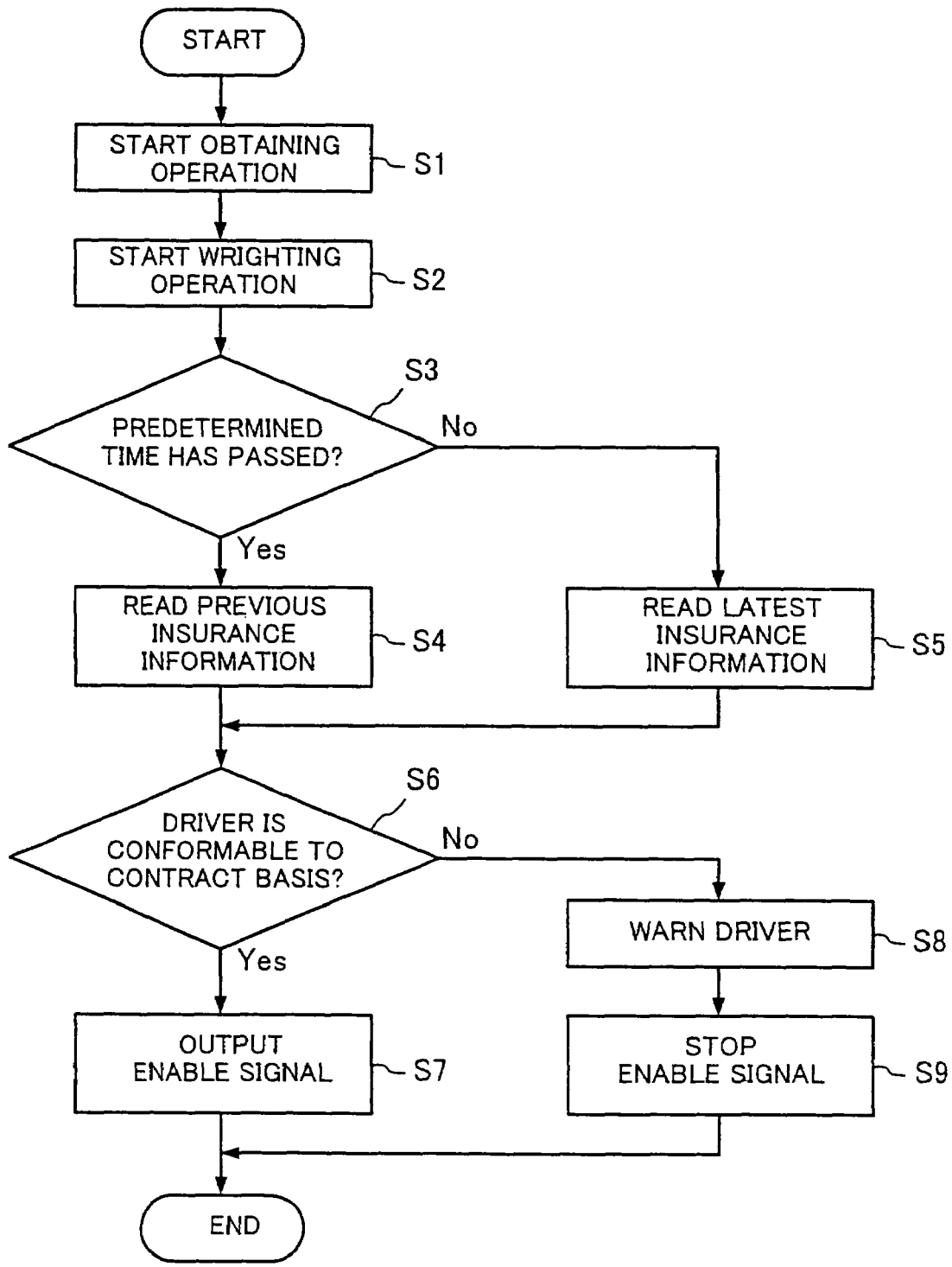
FIG. 4 is a flowchart showing an operation of the warning system according to the sixth embodiment of the present invention.

Referring now to FIGS. 3 and 4 of the drawings, there is shown the sixth embodiment of the warning system according to the present invention.

The warning system is shown in FIG. 3 as having a reference number 300, and comprises an electronic driver's license 110, and a warning apparatus 320 to be installed into the automobile, and adapted to communicate with the electronic driver's license.

The warning apparatus 320 comprises a receiving unit 121 for receiving the enciphered driver's information from the electronic driver's license 110, a deciphering unit 122 for deciphering the enciphered driver's information received by the receiving unit 121, a memorizing unit 323 having memorized therein automobile insurance information on a requirement for being insurant, a clock unit 124 for producing time information on current date and hour, a first determining unit 126 for determining whether or not the personal details are conformable to the requirement for being insurant on the basis of the driver's information received from the electronic driver's license 110 and the automobile insurance information memorized in the memorizing unit 123, and a warning unit 127 for warning the driver on the basis of results determined by the first determining unit 126 when the first determining unit 126 is operated to determine that the personal details are not conformable to the requirement for being insurant, and a permission signal producing unit 128 for producing a permission signal to permit the driver to operate an engine of the automobile when the first determining unit 126 is operated to determine that the personal details are conformable to the requirement for being insurant, a communications unit 134 for obtaining the requirement for being insurant from a server (not shown) through communications network such as for example the internet, a setting unit 129 for setting the requirement for being insurant obtained by the communications unit 134, and a reading and writing unit 324 for allowing the memorizing unit 323 to have the requirement for being insurant set by the setting unit 129 memorized therein, and receiving the requirement for being insurant from the memorizing unit 323. The memorizing unit 323 is constituted by a detachable memorizing unit.

The operation of the warning apparatus according to the sixth embodiment of the present invention will now be described hereinafter with reference to FIG. 4 of the drawings.

The communications unit 134 is firstly operated to start to communicate with the server (not shown), and start to receive the automobile insurance information on the requirement for being insurant from the server (not shown) in the step S1. The reading and writing unit 324 is then operated to start to allow the memorizing unit 323 to have the contact basis of the automobile insurance memorized therein in the step S2. The first determining unit 126 is then operated to determine whether or not the requirement for-being insurant is obtained by the communications unit 324 from the server (not shown) within a predetermined time interval, for example 30 seconds, and determine whether or not the requirement for being insurant is memorized in the memorizing unit 323 by the reading and writing unit 324 within the predetermined time interval in the step S3.

The reading and writing unit 324 is then operated to receive the requirement for being insurant from the memorizing unit 323 when the first determining unit 126 is operated to determine that the requirement for being insurant is not obtained by the communications unit 324 from the server (not shown) within the predetermined time interval in the step S4. Here, the memorizing unit 323 preferably has memorized therein the latest contract basis of the automobile insurance previously received by the communications unit 134 through a personal computer and a mobile phone.

The reading and writing unit 324 is then operated to receive the latest contract basis of the automobile insurance from the memorizing unit 323 after the requirement for being insurant obtained by the communications unit 134 within the predetermined time interval completely is memorized in the memorizing unit 323 in the step S5. The first determining unit 126 is then operated to determine whether or not the personal details are conformable to the requirement for being insurant by comparing the automobile insurance information memorized in memorizing unit 323 with the driver's information received by the receiving unit 121 in the step S6.

The permission signal producing unit 128 is then operated to produce the permission signal to permit the driver to operate the automobile on the basis of results determined by the first determining unit 126 when the first determining unit 126 is operated to determine that the personal details are conformable to the requirement for being insurant in the step S7, while the automobile is controlled by the engine control unit 131 and the transmission control unit 132 in response to the permission signal produced'by the permission signal producing unit 128.

When, on the other hand, the first determining unit 126 is operated to determine that the personal details are not conformable to the requirement for being insurant, the warning unit 127 is operated to warn the driver on the basis of results determined by the first determining unit 126 in the step S8. The permission signal producing unit 128 is then operated to assume "OFF" state to fail to produce the permission signal in the step S9. The automobile is not started to be controlled by the engine control unit 131 and the transmission control unit 132.

From the above detail description, it will be understood that the warning apparatus can determine whether or not the personal details are conformable to the latest contract basis of the automobile insurance on the basis of the automobile insurance information obtained by the communications unit 134.

The warning apparatus can determine whether or not the personal details are conformable to the latest contract basis of the automobile insurance on the basis of the automobile insurance information memorized by the detachable memorizing unit 323.

The warning apparatus can promptly decide whether or not the personal details are conformable to the requirement for being insurant on the basis of any one of the automobile insurance information memorized by the detachable memorizing unit 323 and the automobile insurance information obtained by the communications unit 134.

Figure 5:
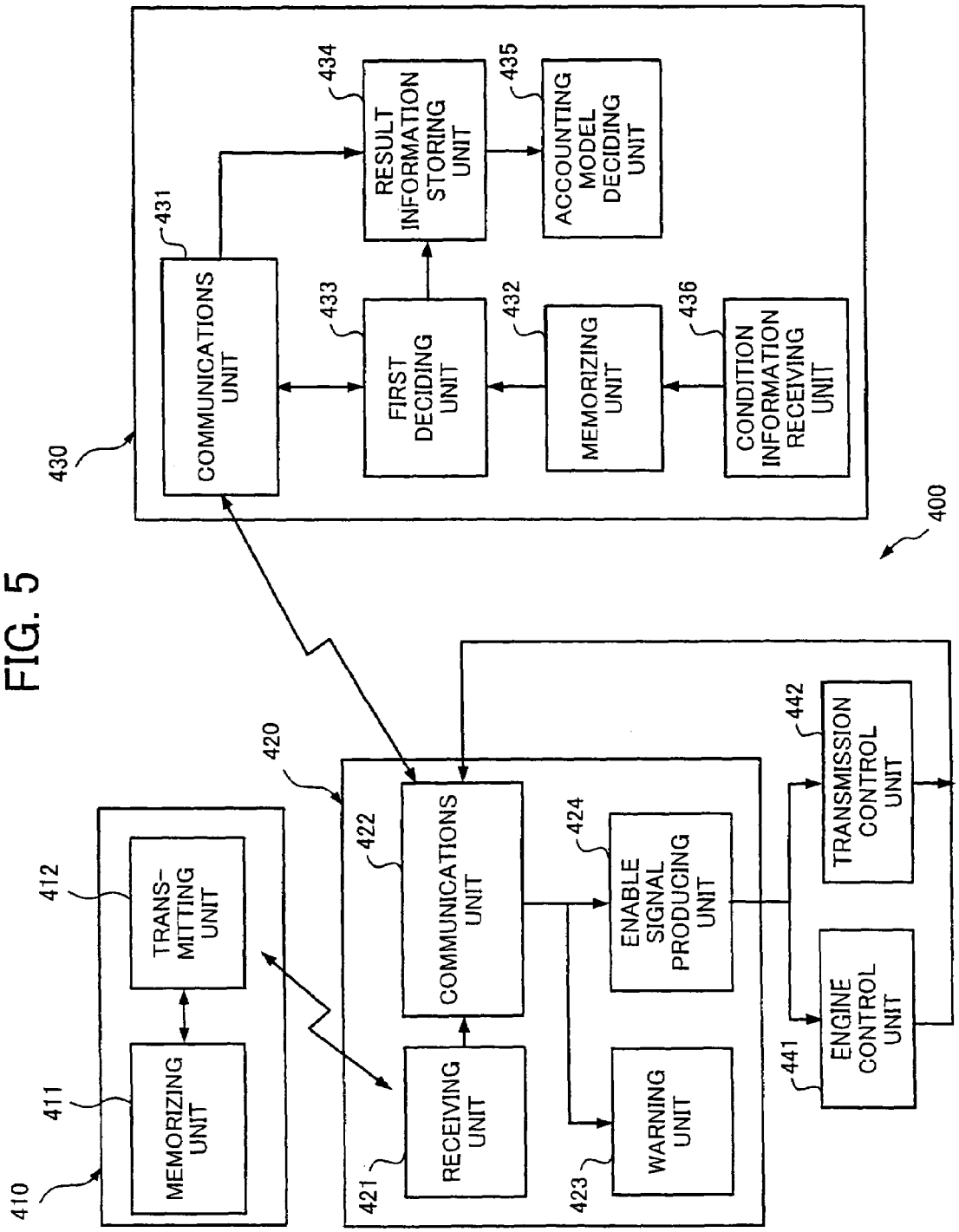
FIG. 5 is a block diagram of the warning system according to the seventh embodiment of the present invention.
Figure 6:
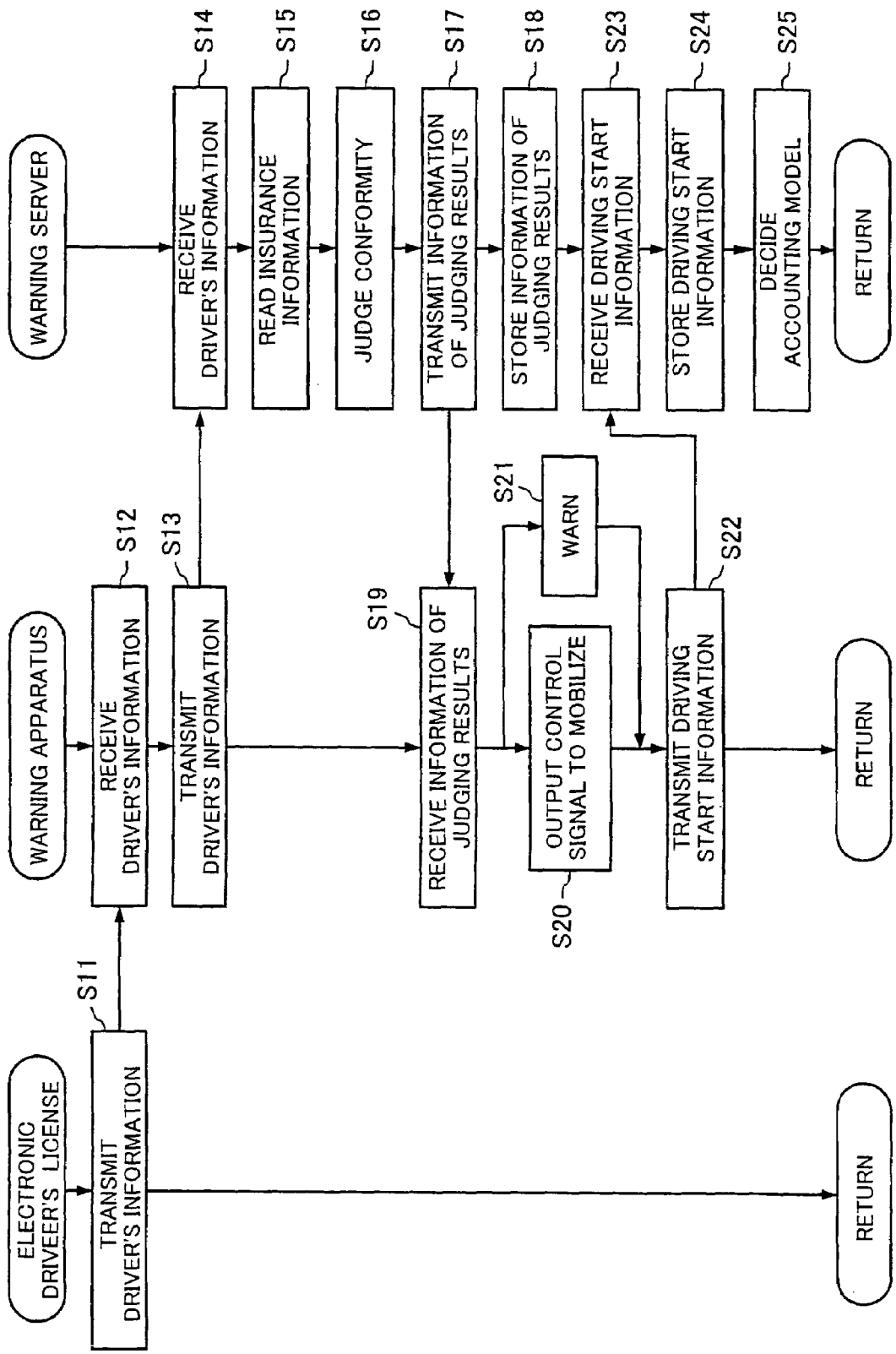
FIG. 6 is a flowchart showing an operation of the warning system according to the seventh embodiment of the present invention.
Figure 6:
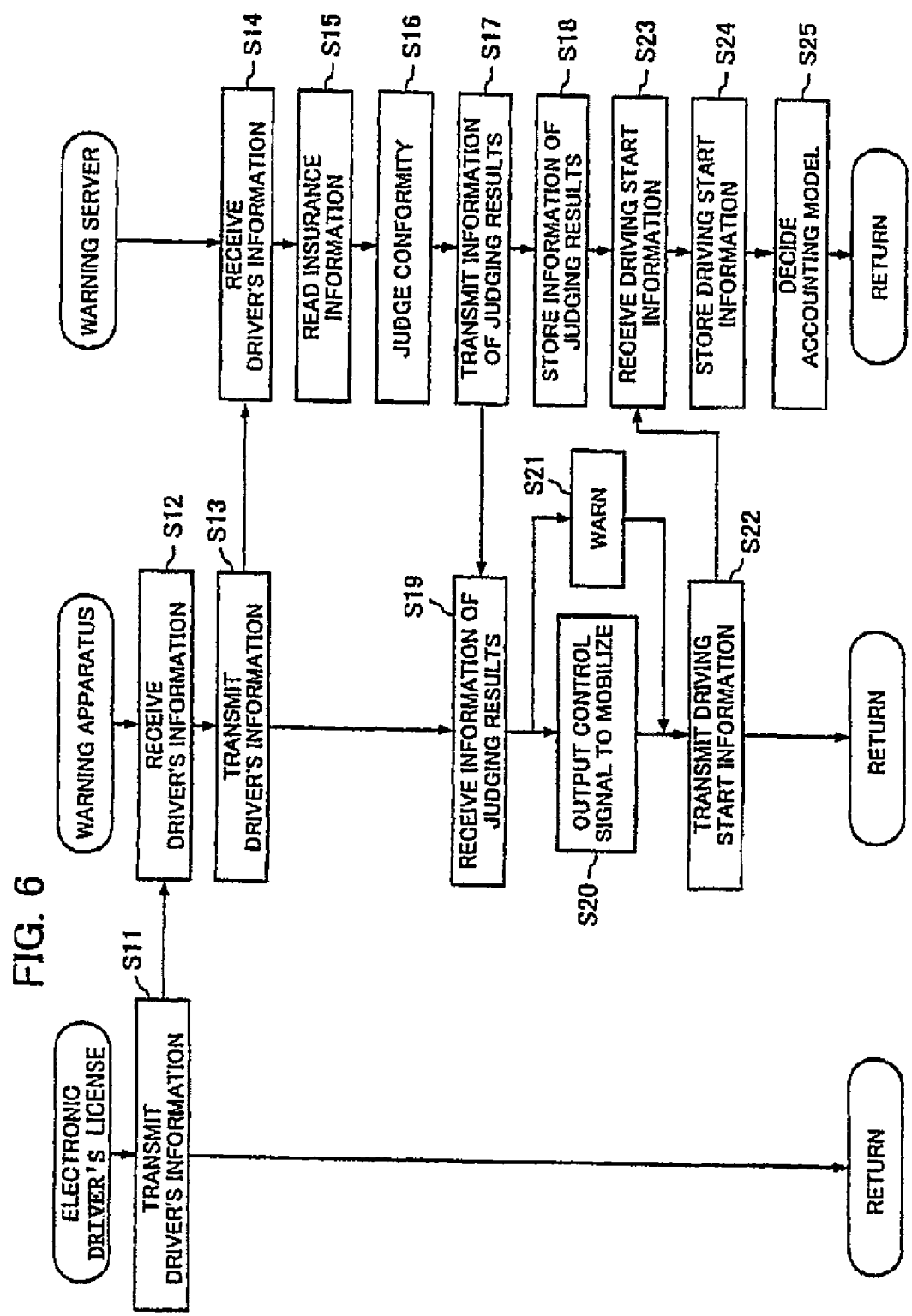

Referring now to FIGS. 5 to 7 of the drawings, there is shown the seventh embodiment of the warning system according to the present invention.

The warning system is shown in FIG. 5 as having a reference number 400, and comprises an electronic driver's license 410, a warning apparatus 420 to be installed into the automobile, and adapted to communicate with the electronic driver's license, and a warning server 430 for communicating with the warning apparatus 420.

The electronic driver's license 410 includes a memorizing unit 411 having driver's information on personal details and driver's license, and a transmitting unit 412 for transmitting the driver's information memorized in the memorizing unit 412 to the warning apparatus 420.

The warning apparatus 420 includes a receiving unit 421 for receiving the driver's information from the electronic driver's license 410, a communications unit 422 for transmitting the driver's information received by the receiving unit 421 to the warning server 430, and receiving various kinds of information, a warning unit 423 for warning the driver on the basis of the information received from the receiving unit 422, and a permission signal producing unit 424 for producing a permission signal to permit the driver to operate the automobile. The permission signal producing unit 424 of the warning apparatus 420 is electrically connected to each of an engine control unit 441 and a transmission control unit 442 of the automobile.

The communications unit 422 of the warning apparatus 420 is electrically connected to each of the engine control unit 441 and the transmission control unit 442 of the automobile, and operative to determine whether or not the automobile is started to be operated by the driver, and to transmit condition information on a start of the automobile to the warning server 430.

The warning server 430 includes a communications unit 431 for receiving the driver's information from the communications unit 422 of the warning apparatus 420, and transmitting the various kinds of information, a memorizing unit 432 having automobile insurance information on a requirement for being insurant, a first determining unit 433 for determining whether or not the personal details are conformable to the requirement for being insurant on the basis of the driver's information received by the communications unit 431 and the automobile insurance information memorized in the memorizing unit 432, a supervisory information storing unit 434 for produce supervisory information on mutual relation between result information on results determined by the first determining unit 433 of the warning server 430 and the condition information received from the communications unit of the warning server 430, and having the supervisory information memorized therein, and an accounting model deciding unit 435 for deciding on an accounting model on the basis of the supervisory information memorized in the result information storing unit 434 of the warning server 430.

The communications unit 431 of the warning server 430 includes a receiving means for receiving the driver's information from the communications unit 422 of the, warning apparatus 420, a result information transmitting means for transmitting the results information to the communications unit 422 of the warning apparatus 420, and a condition information receiving means for receiving the condition information from the communications unit 422 of the warning apparatus 420.

The operation of the warning system according to the seventh embodiment of the present invention will now be described hereinafter with reference to FIGS. 6 and 7 of the drawings.

The driver's information memorized in the memorizing unit 411 of the electronic driver's license 410 is firstly transmitted to the warning apparatus 420 by the transmitting unit 412 of the electronic driver's license 410 in the step S11. The driver's information transmitted by the transmitting unit 412 of the electronic driver's license 410 is then received by the receiving unit 421 of the warning unit 420 in the step S12. The driver's information received by the receiving unit 421 of the warning apparatus 420 is then transmitted to the warning server 430 by the communications unit 421 of the warning apparatus 420 in the step S13.

The driver's information transmitted by the communications unit 421 of the warning apparatus 420 is then received by the communications unit 431 of the warning server 430 in the step S14. The automobile insurance information memorized in the memorizing unit 432 is then obtained by the first determining unit 433 of the waning server 430 in the step S15. The first determining unit 433 of the warning server 430 is then operated to determine whether or not the personal details are conformable to the requirement for being insurant on the basis of the driver's information received by the communications unit 433 of the warning server 430 and the automobile insurance information memorized in the memorizing unit 432 of the warning server 430 in the step S16.

When the answer in the step S16 is affirmative "YES", i.e., the personal details are conformable to the requirement for being insurant, the result information on results determined by the first determining unit 433 of the warning server 430 is then transmitted by the communications unit 431 of the warning server 430 to the warning apparatus 420 in the step S17, and then memorized in the result information storing unit 434 of the warning apparatus 420 in the step S18. The result information transmitted by the communications unit 431 of the warning server 430 is then received by the communications unit 422 of the warning apparatus 420 in the step S19. The permission signal producing unit 424 of the warning apparatus 420 is then operated to produce the permission signal to permit the driver to operate the automobile in response to the result information received by the communications unit 422 of the warning apparatus 420 in the step S20. The step S20 proceeds to the step S22.

When, on the other hand, the answer in the step S16 is negative "NO", i.e., the personal details are not conformable to the requirement for being insurant, the result information on results determined by the first determining unit 433 of the warning server 430 is then transmitted by the communications unit 431 of the warning server 430 to the warning apparatus 420 in the step S17, and then memorized in the result information storing unit 434 of the warning server 430 in the step S18. The result information transmitted by the communications unit 431 of the warning server 430 is then received by the communications unit 422 of the warning apparatus 420 in the step S19. The permission signal producing unit 424 of the warning apparatus 420 is then operated to assume "OFF" state to fail to produce the permission signal to permit the driver to operate the automobile in response to the result information received by the communications unit 422 of the warning apparatus 420. The warning unit 423 of the warning apparatus 420 is then operated to warn the driver on the basis of the result information received by the communications unit 422 of the warning apparatus 420 in the step S21. The communications unit 422 of the warning apparatus 420 is then operated to transmit the condition information on the start of the automobile in combination with each of the engine control unit 441 and transmission control unit 442 in the step S22.

The condition information transmitted by the communications unit 422 of the warning apparatus 420 is then received by the communications unit 431 of the warning server 430 in the step S23. The result information storing unit 434 of the warning server 430 is then operated to produce supervisory information on mutual relation between result information on results determined by the first determining unit 433 of the warning server 430 and the condition information received from the communications unit 431 of the warning server 430, and have the supervisory information memorized therein in the step S24. The accounting model deciding unit 435 of the warning server 430 is operated to decide on the accounting model on the basis of the supervisory information memorized in the result information storing unit 434 of the warning server 430 in the step S25.

The accounting model deciding unit 435 of the warning server 430 is operated to, for example, determine whether or not the automobile is operated by only the driver conformable to the requirement for being insurant on the basis of records of the result information and the condition information memorized in the result information storing unit 434 of the warning server 430. This leads to the fact that the advantageous accounting model can be applied to the next contract basis of the insurance.

From the above detail description, it will be understood that the warning system according to the present invention can efficiently determine whether or not the personal details are conformable to the latest contract basis of the insurance on the basis of the driver's information received by the communications unit 433 of the warning server 430 and the latest automobile insurance information memorized in the memorizing unit 432 of the warning server 430.

The warning server according to the present invention can efficiently determine whether or not the automobile has a traffic accident while being operated by the driver who is not conformable to the requirement for being insurant on the basis of the on the basis of the records of the result information memorized in the result information storing unit 434 of the warning server 430. This leads to the fact that the insurance company can efficiently send to aforesaid driver the effect that the insurance is not applicable to aforesaid traffic accident.

As shown in FIG. 7, the warning server according to the present invention can determine whether or not the automobile has a traffic accident while being operated by the driver who is not conformable to the requirement for being insurant on the basis of the records of the supervisory information memorized in the result information storing unit 434 of the warning server 430. This leads to the fact that the insurance company can clearly determine that the insurance is not applicable to aforesaid traffic accident on the basis of the records of the supervisory information memorized in the result information storing unit 434 of the warning server 430.

The insurance company can clearly determine whether or not the assured person complies with the requirement for being insurant on the basis of the records of the supervisory information memorized in the result information storing unit 434 of the warning server 430. This leads to the fact that the accounting model deciding unit 435 of the warning server 430 can decide on the advantageous accounting model which is applicable to the next contract basis of the automobile insurance.

The warning server may comprise a communications unit for receiving driver's information; a memorizing unit for memorizing automobile insurance information; and a determining unit for determining whether or not the driver is an insurant by comparing the driver's information received by the communications unit with the automobile insurance information memorized in the memorizing unit, and the communications unit being operative to transmit results information on results determined by the determining unit. The warning server may further comprise a results information memorizing unit for memorizing the results information on results determined by the determining unit. The communications unit may be operative to receive condition information on a start of the automobile. The results information storing unit may be operative to produce supervisory information on mutual relation between the results information with the condition information received by the communications unit, and to memorize the supervisory information. The warning server may further comprise an accounting model deciding unit for deciding on an accounting model on the basis of the supervisory information memorized in the results information storing unit.

The warning system may comprise a warning apparatus for an automobile; and a waning server to be communicated with the warning apparatus, the warning server, including: a communications unit for receiving driver's information from the warning apparatus; a memorizing unit for memorizing automobile insurance information; and a determining unit for determining whether or not the driver is an insurant by comparing the driver's information received by the communications unit with the automobile insurance information memorized in the memorizing unit, and the warning apparatus including a warning unit for warning the driver not to drive when the determining unit of the warning server has determined that the driver is not the insurant.

The warning apparatus may further include a permission signal producing unit for producing a permission signal to permit the driver to operate the automobile when the determining unit of the warning server has determined that the driver is the insurant. The warning apparatus further includes a prevention signal producing unit for producing a prevention signal to prevent the driver from operating the automobile a prevention when the determining unit of the warning server has determined that the driver is not the insurant. The warning server may further include a results information storing unit for memorizing results information on results determined by the determining unit of the warning server. The communications unit of the warning server is operative to receive condition information on a start of the automobile from the warning apparatus. The results information storing unit of the warning server may be operative to produce supervisory information on mutual relation between'the results information with the condition information received by the communications unit of the warning server, and to memorize the supervisory information.

The warning server may further include an accounting model deciding unit for deciding on an accounting model on the basis of the supervisory information memorized in the results information storing unit. The warning system may further comprise a memory device for memorize driver's information. The receiving unit of the warning server may be operative to receive the driver's information from the memory device through the warning apparatus. The memory device may be constituted of an electronic key to the automobile. The memory device may be constituted of an electronic driver's license having license information on the automobile. The warning server may further include a determining unit for determining whether or not the license information is legitimate on the basis of the license information memorized in the electronic driver's license.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed:

1. A warning server, comprising:
    a communications unit for receiving driver's information on personal details;
    a memorizing unit having automobile insurance information on a requirement for being insurant; and
    a first determining unit for determining whether or not said personal details are conformable to a contract basis of said automobile insurance by comparing said driver's information received by said communications unit with said automobile insurance information memorized in said memorizing unit, and
    said communications unit being operative to transmit results information on results determined by said first determining unit and in which said communications unit is operative to receive condition information on start of said automobile, and in which said results information storing unit is operative to produce supervisory information on mutual relation between said results information memorized therein with said condition information received by said communications unit, and to have said supervisory information memorized therein.

2. A warning server as set forth in claim 1, which further comprises a results information memorizing unit having memorized therein said results information on results determined by said first determining unit.

3. A warning server as set forth in claim 1, which further comprises an accounting model deciding unit for deciding on an accounting model on the basis of said supervisory information memorized in said results information storing unit.

4. A warning system, comprising:
    a warning apparatus to be installed into an automobile; and
    a warning server to be communicated with said warning apparatus,
    said warning server, including:
    a communications unit for receiving driver's information on personal details from said warning apparatus;
    a memorizing unit having automobile insurance information on a requirement for being insurant; and
    a first determining unit for determining whether or not said personal details are conformable to a contract basis of said automobile insurance by comparing said driver's information received by said communications unit with said automobile insurance information memorized in said memorizing unit, and
    said warning apparatus including a warning unit for warning a driver on the basis of results determined by said first determining unit of said warning server when said first determining unit of said warning server is operated to determine that said personal details are conformable to said contract basis of said automobile insurance and a permission signal producing unit for producing a permission signal to permit said driver to operate said automobile when said first determining unit of said warning server is operated to determine that said personal details are conformable to said contract basis of said automobile insurance.

5. A warning system as set forth in claim 4, in which said warning apparatus further includes a prevention signal producing unit for producing a prevention signal to prevent said driver from operating said automobile when said first determining unit of said warning server is operated to determine that said personal details are not conformable to said contract basis of said automobile insurance.

6. A warning system as set forth in claim 4, in which said warning server further includes a results information storing unit having memorized therein results information on results determined by said first determining unit of said warning server.

7. A warning system as set forth in claim 6, in which said communications unit of said warning server is operative to receive condition information on a start of said automobile from said warning apparatus, and in which said results information storing unit of said warning server is operative to produce supervisory information on mutual relation between said results information memorized therein with said condition information received by said communications unit of said warning server, and to have said supervisory information memorized therein.

8. A warning system as set forth in claim 7, in which said warning server further includes an accounting model deciding unit for deciding on an accounting model on the basis of said supervisory information memorized in said results information storing unit.

* * * * *

UNITED STATES PATENT AND TRADEMARK OFFICE
CERTIFICATE OF CORRECTION

PATENT NO. : 7,170,398 B2
APPLICATION NO. : 11/357322
DATED : January 30, 2007
INVENTOR(S) : Masahiro Yuhara It is certified that error appears in the above-identified patent and that said Letters Patent is hereby corrected as shown below:

In the Figures:

In Figure 6, on Sheet 6 of 7, in left column, top row, please delete the word "DRIVEER'S"; replace with the word --DRIVER'S-- (see new sheet attached)

In the Specifications:

Column 1, line 51: Delete the word "drover's", replace with the word --driver's--;

Column 3, line 56: Delete the word "warming"; replace with the word --warning--;

Column 4, line 4: Delete the word "memorize"; replace with the word --memorizing--;

Column 11, line 54: Delete the word "deriver's"; replace with the word --driver's--;

Column 13, line 66: Delete the letter "s" at the end of the word "comprises";

Column 13, line 66: After the word "comprises"; insert the word --of--;

Column 14, line 1: Delete the word "drover's"; replace with the word --driver's--;

Column 20, line 30: Delete the word "fait"; replace with the word --fail--;

Column 20, line 37: Delete the word "drover's"; replace with the word --driver's--;

Signed and Sealed this

Twelfth Day of June, 2007

JON W. DUDAS
*Director of the United States Patent and Trademark Office*